(12) United States Patent
Orui et al.

(10) Patent No.: US 6,816,587 B1
(45) Date of Patent: Nov. 9, 2004

(54) VIRTUAL PRIVATE LINE CONNECTION SYSTEM AND METHOD

(75) Inventors: Takeo Orui, Tokyo (JP); Takashi Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 682 days.

(21) Appl. No.: 09/609,368

(22) Filed: Jul. 3, 2000

(30) Foreign Application Priority Data

Jul. 1, 1999 (JP) .......................................... 11-187183

(51) Int. Cl.[7] .............................................. H04M 7/00
(52) U.S. Cl. .................. 379/225; 379/221.15; 379/901
(58) Field of Search .......................... 379/93.01, 93.06, 379/221.15, 225, 231, 232, 234, 237, 901, 229, 230

(56) References Cited

U.S. PATENT DOCUMENTS

| | | | | |
|---|---|---|---|---|
| 5,422,943 A | * | 6/1995 | Cooney et al. ............. | 379/225 |
| 5,646,985 A | * | 7/1997 | Andruska et al. ......... | 379/265.1 |
| 5,771,275 A | | 6/1998 | Brunner et al. | |
| 5,818,921 A | * | 10/1998 | Vander Meiden et al. .. | 379/225 |
| 5,838,781 A | * | 11/1998 | Isaksson ..................... | 379/229 |
| 5,937,035 A | * | 8/1999 | Andruska et al. ......... | 379/32.03 |
| 6,233,313 B1 | * | 5/2001 | Farris et al. ........... | 379/112.01 |
| 6,453,035 B1 | * | 9/2002 | Psarras et al. ......... | 379/221.08 |

FOREIGN PATENT DOCUMENTS

| | | |
|---|---|---|
| JP | A 64-5153 | 1/1989 |
| JP | A 3-96054 | 4/1991 |
| JP | 4165892 | 6/1992 |
| JP | 9266509 | 10/1997 |
| WO | 98/21904 | 5/1998 |

* cited by examiner

Primary Examiner—Bing Q. Bui
(74) Attorney, Agent, or Firm—Young & Thompson

(57) ABSTRACT

A virtual private line connection method allowing efficient and economical virtual private line service in the public ISDN is disclosed. When a SS7 (common channel signalling system No. 7) message is generated in response to a call originated by a terminal accommodated in a PBX, the SS7 message is encapsulated in an ISDN message and the ISDN message is sent to the destination PBX on a D channel. When the destination PBX receives the ISDN message, the SS7 message is read from the received ISDN message to establish the virtual private line between the PBXs.

15 Claims, 5 Drawing Sheets

VIRTUAL PRIVATE LINE CONNECTION SYSTEM AND METHOD

BACKGROUND OF THE INVENTION

1. Field of the Invention

The present invention relates to a technique for providing a connection service to terminals each accommodated in private branch exchanges (PBXs) through a virtual private line in Integrated Services Digital Network (ISDN).

2. Description of the Related Art

There has been proposed a technique of establishing a virtual private line as necessary in ISDN (see Japanese Patent Application Unexamined Publication No. 9-266509). More specifically, PBXs are connected to each other through an analog/digital private line and, if necessary, a virtual private line can be established between the PBXs using an IDSN line. Therefore, telephone terminals accommodated in respective PBXs are capable of communicating with each other using the virtual private line as an alternative route.

Another virtual private line connection technique using ISDN has been disclosed in Japanese Patent Application Unexamined Publication No. 4-165892. In this conventional system, each PBX is connected to the ISDN through a primary rate interface (23B+D) trunk circuit. When a virtual private line is established, one or more B channel is used for voice and another B channel is used for signalling. A D-channel controller is connected to the primary rate interface trunk circuit to control the D channel of the primary rate interface. A D-channel controller is also connected to the primary rate interface trunk circuit to control the signalling B channel of the virtual private line. More specifically, SS7 (common channel signalling system No. 7) messages are controlled by the D-channel controller to be transferred on the signalling a channel of the virtual private line. Therefore, after having established the voice and signalling B channels, the existing ISDN signal procedure can be performed with no problems by conforming to the SS7 procedures.

However, it is necessary for each PBX to be provided with the D-channel controller, resulting in great difficulty in cost reduction and the increased amount of hardware in the PBX.

Further, at least two B channels are needed to establish the virtual private line. Therefore, the efficiency of use of the network is reduced and the communication cost is increased because of a charge for at least two B channels.

SUMMARY OF THE INVENTION

An object of the present invention is to provide a virtual private line connection system and method allowing efficient and economical virtual private line service in the ISDN.

According to the present invention, a method for establishing a virtual private line between a first private branch exchange (PBX) and a second PBX through an integrated Services Digital Network (ISDN) to connect a first terminal accommodated in the first PBX and a second terminal accommodated in the second PBX, includes the steps of: at the first PBX having a first digital interface trunk circuit connected to the ISDN, a) generating an SS7 (common channel signalling system No. 7) message in response to a call originated by the first terminal; b) generating an ISDN message having the SS7 message included therein; and c) sending the ISDN message to the second PBX on a D channel of the first digital interface trunk circuit, and at the second PBX having a second digital interface trunk circuit connected to the ISDN, d) receiving the ISDN message from the first PBX on a D channel of the second digital interface trunk circuit; and e) reading the SS7 message from the ISDN message received to establish the virtual private line between the first and second PBXs, allowing the first and second terminals to communicate with each other through the virtual private line.

The step (b) preferably includes the steps of: b.1) generating an ISDN message for the SS7 message; b.2) setting a virtual private line flag indicating that the SS7 message is used for virtual private line connection; b.3) storing the virtual private line flag and the SS7 message in a facility information element of the ISDN message.

The step (e) preferably includes the steps of: e.1) reading the facility information element from the ISDN message received from the first PBX; e.2) determining whether the virtual private line flag included in the facility information element is set; e.3) when the virtual private line flag is set, reading the SS7 message from the facility information element to establish the virtual private line.

As described above, the SS7 message is included in the ISDN message and is sent to the other PBX on the D channel to establish the virtual private line in the ISDN. Therefore, the need for a signalling B channel is eliminated. Since the ISDN message having the SS7 message encapsulated therein is sent on the D channel, the virtual private line can be established conforming to specifications for inter-PBX signalling protocol defined in the international standard ISO/IEC11582, ETS 300 239, JS-11582 Private Integrated Services Network (Generic Functional Protocol for the support of supplementary services). Therefore, the transparency and versatility of the public ISDN can be ensured.

DETAILED DESCRIPTION OF THE PREFERRED EMBODIMENT

Hereafter, a virtual private line connection system according to an embodiment of the present invention will be described.

Figure 1:
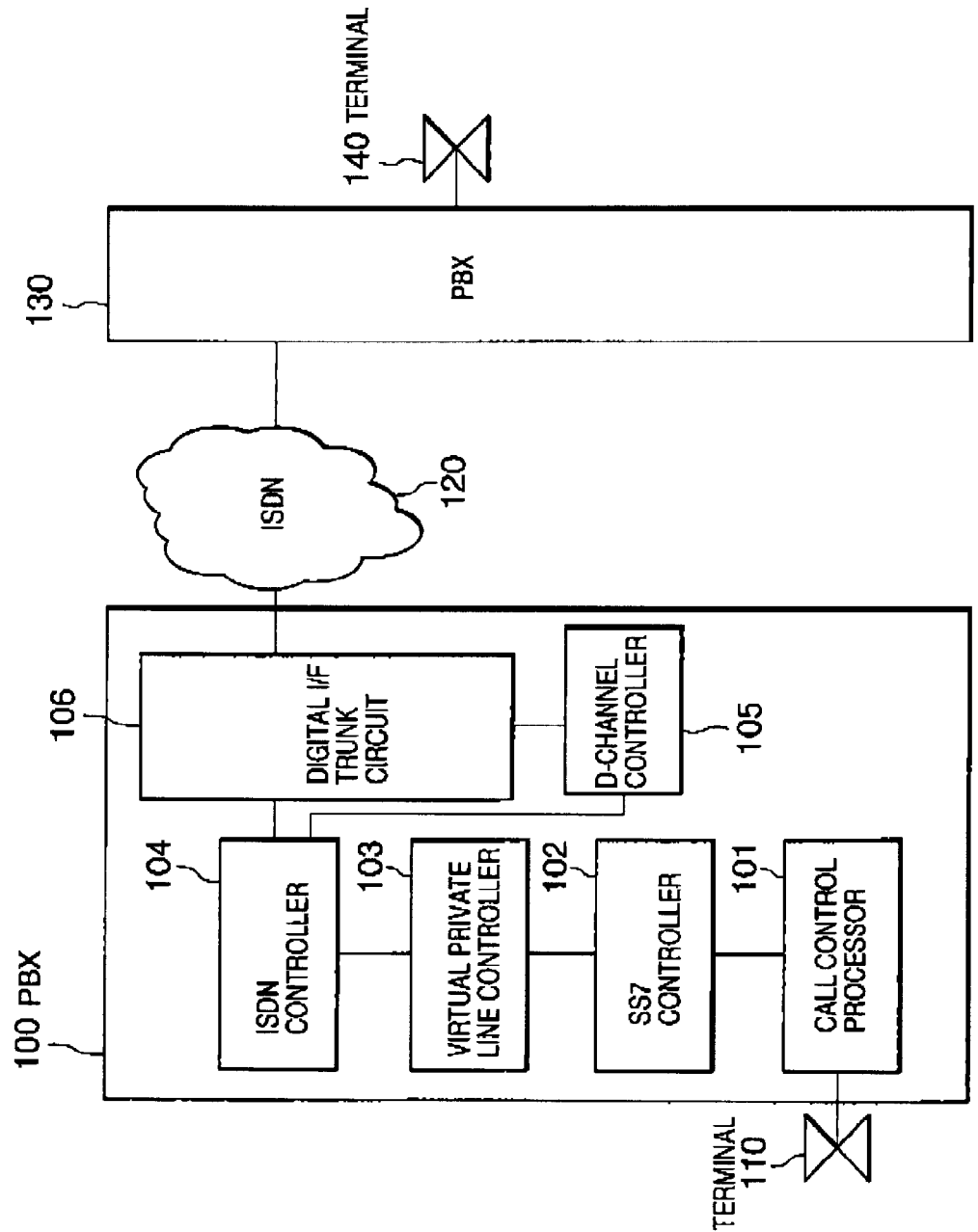
FIG. 1 is a block diagram showing a virtual private line connection system according to an embodiment of the present invention.

As shown in FIG. 1, the virtual private line connection system is composed of PBX 100, public ISDN 120, PBX 130, and terminals 110 and 140 that are accommodated in the PBXs 100 and 130, respectively. Although each of the PBXs 100 and 130 is capable of accommodating a plurality of terminals, for simplicity only one terminal for each PBX is shown in FIG. 1.

The PBX 100 includes a call control processor 101, a SS7 controller 102, a virtual private line controller 103, an ISDN controller 104, a D-channel controller 105, and a digital interface trunk circuit 106. The call control processor 101 performs processing of a call originating from or destined to the terminal 110 depending on a SS7 control signal. The SS7 controller 102 performs processing of a SS7 message according to the signalling system No. 7.

The virtual private line controller 103 includes a registration number memory that stores registered numbers, which are used to determine whether a dialed number originating from the terminal 110 or a source number of an incoming call from the terminal 140 is a registered number. In other words, the virtual private line controller 103 has a function of determining whether an originating terminal has been permitted to use the virtual private line.

In addition, the virtual private line controller 103 performs communication procedures conforming to specifications for inter-PBX signalling protocol defined in the international standard ISO/IEC11582, ETS 300 239, JS-11562 Private Integrated Services Network (Generic Functional Protocol for the support of supplementary services).

The ISDN controller 104 controls the D-channel controller 105 and the digital interface trunk circuit 106. The PBX 130 has the same circuit configuration as the PBX 100. The operations of the SS7 controller 102, the virtual private line controller 103, and the ISDN controller 104 will be described later.

Figure 2:
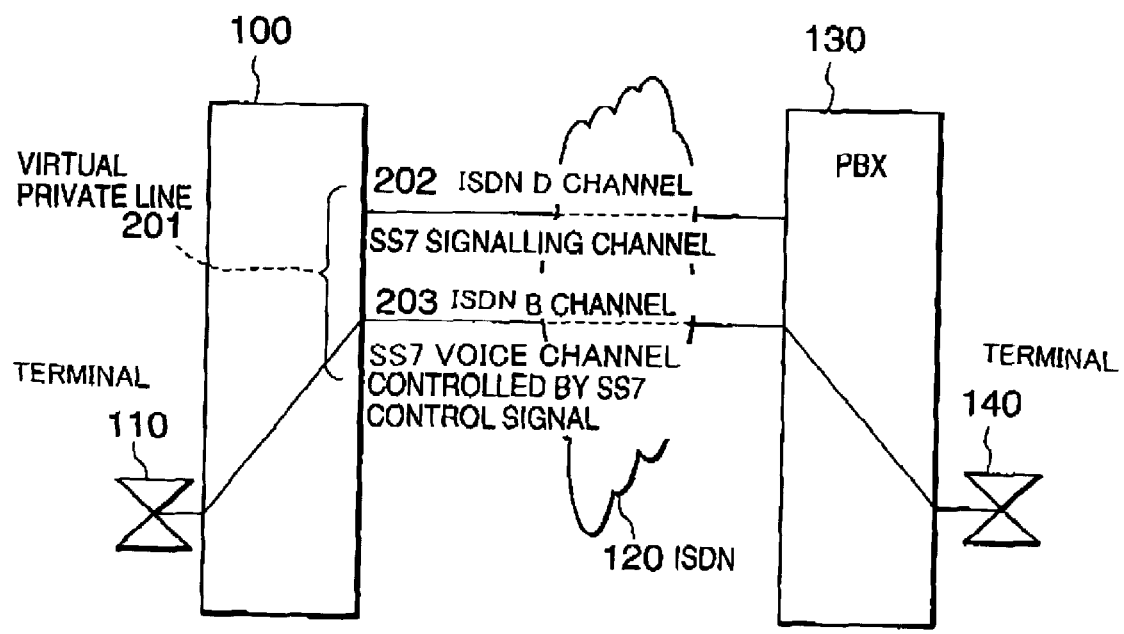
FIG. 2 is a diagram showing a channel configuration of the embodiment as shown in FIG. 1.

Referring to FIG. 2, the PBX 100 is connected to the PBX 130 through a virtual private line 201. The virtual private line 201 is composed of one ISDN D channel 202 as SS7 signalling channel and one ISDN B channel 203 for SS7 voice channel controlled by a SS7 message that is encapsulated in an ISDN message transferred through the D channel 202. In this way, the terminal 110 can communicate with the terminal 140 through the B channel 203.

Figure 3:
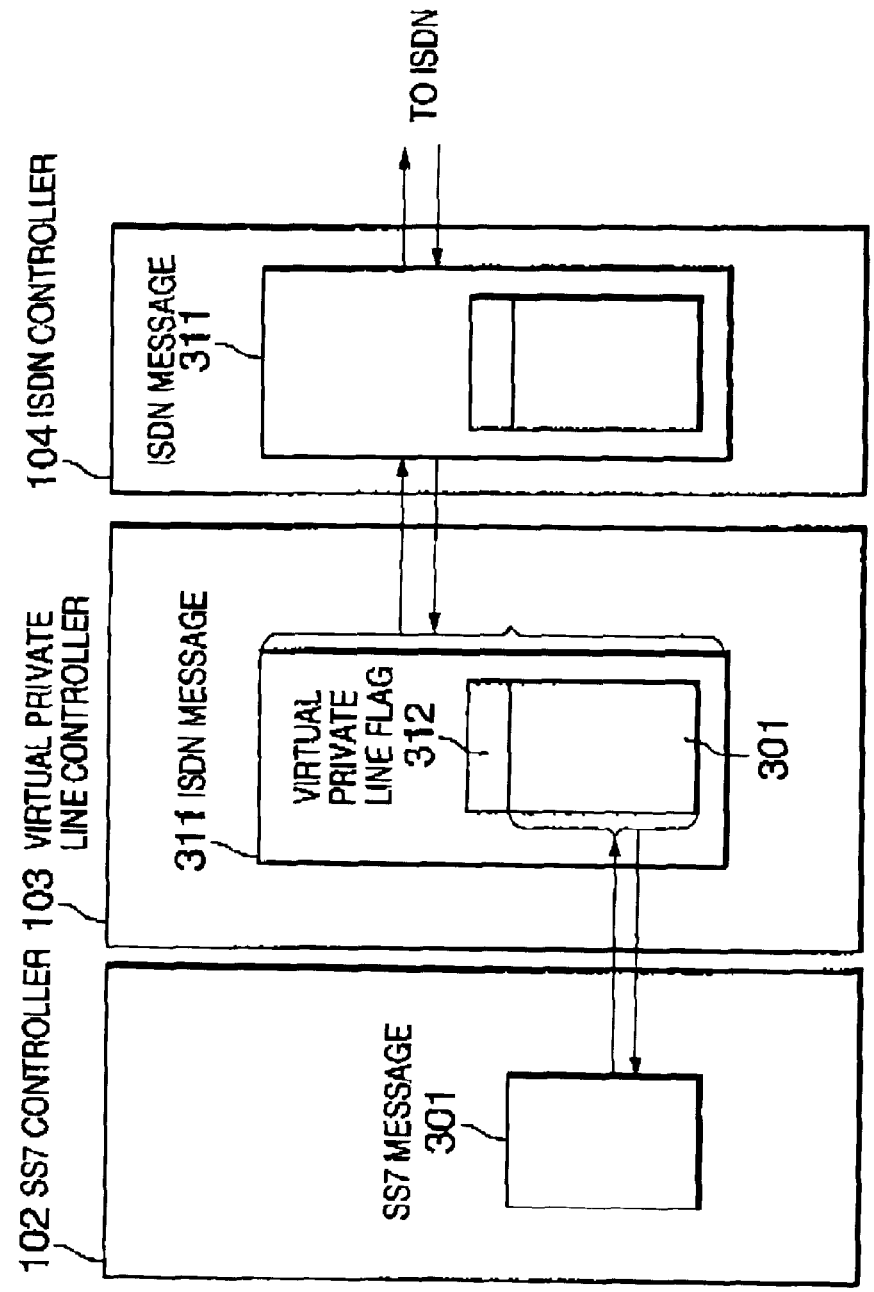
FIG. 3 is a diagram showing a flow of message formation iii the embodiment as shown in FIG. 1.

Referring to FIG. 3, when dialing a destination number at the terminal 110, the SS7 controller 102 generates a SS7 message 301 and outputs it to the virtual private line controller 103. In the virtual private line controller 103, the SS7 message 301 is encapsulated in on ISDN message 311 with a virtual private line flag 312 added thereto. The ISDN message 311 is output to the ISDN controller 104 and is transferred through the D channel 202 by the digital interface trunk circuit 106 under control of the D-channel controller 105.

On the other hand, when receiving an ISDN message having a SS7 message encapsulated therein with a virtual private line flag from the PBX 130, the virtual private line controller 103 reads the SS7 message from the received ISDN message and outputs the SS7 message to the SS7 controller 102.

The details of the operation of the virtual private line controller 103 will be described hereafter.

Figure 4:
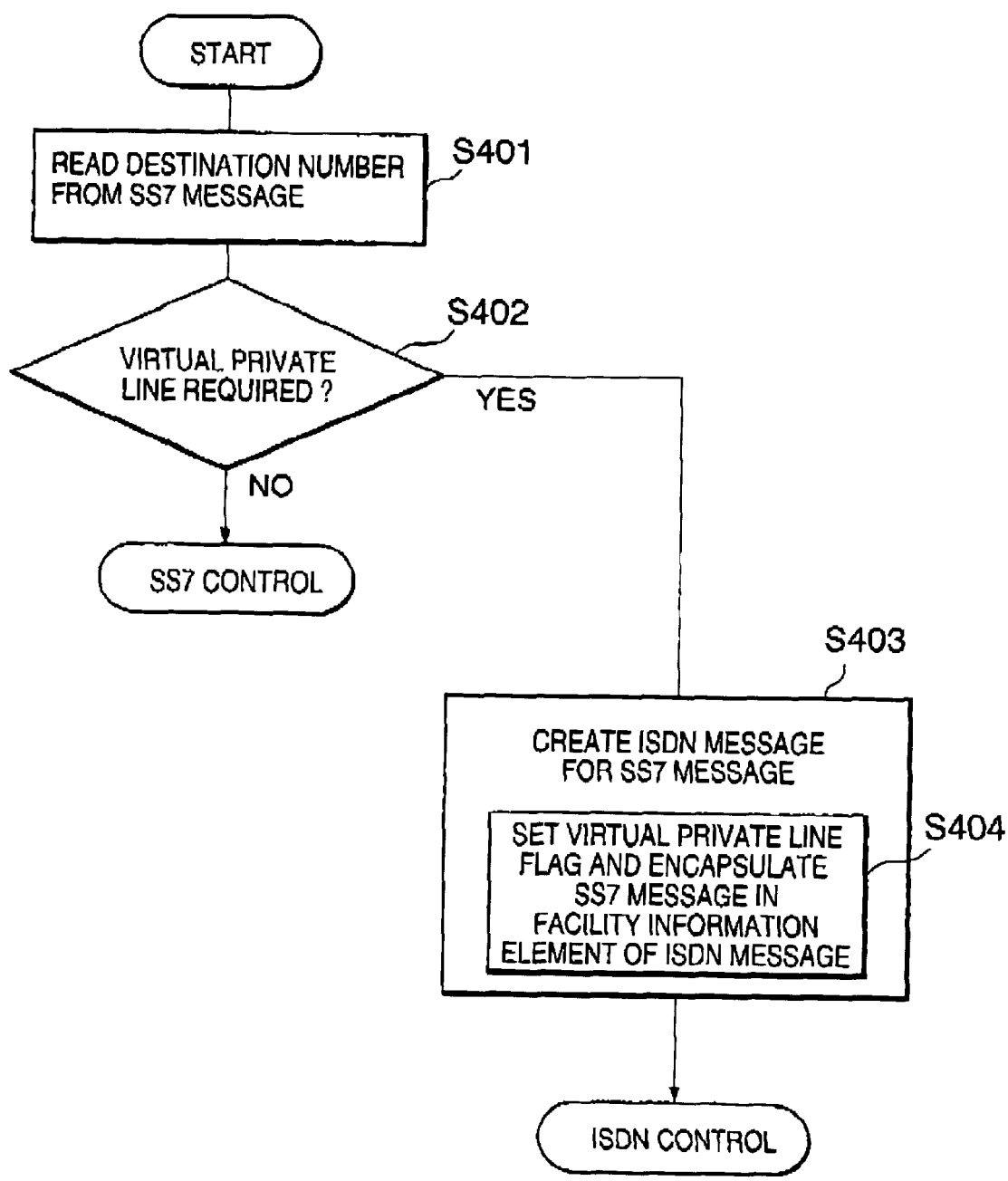
FIG. 4 is a flowchart showing an operation of a sending PBX in the embodiment.

Referring to FIG. 4, the virtual private line controller 103 monitors occurrence of a SS7 message at all times. When receiving the SS7 message 301 from the SS7 controller 102, the virtual private line controller 103 reads a destination number dialed by the terminal 110 from the SS7 message 301 (step S401). Then the virtual private line controller 103 searches the registration number memory for the destination number to determine whether the destination number requires the virtual private line service (step S402).

When the destination number needs the virtual private line service (YES in Step S402), the virtual private line controller 103 creates an ISDN message corresponding to the SS7 message (step S403). When such an ISDN message is created, a virtual private line flag is set to indicate that the ISDN message is of the virtual private line service. Then, the SS7 message accompanied by the set virtual private line flag is encapsulated in the Facility information element of the ISDN message (step S404). At this stage, the SS7 message is "IAI (Initial Address Information)" and the corresponding ISDN message is "FACILITY". Thereafter, the ISDN message having the SS7 message and the virtual private line flag encapsulated therein is transmitted to the PBX 130 through the digital interface trunk circuit 106.

The PBX 130 receives the ISDN message having the SS7 message and the virtual private line flag encapsulated therein from the PBX 100 via the D channel 202.

Figure 5:
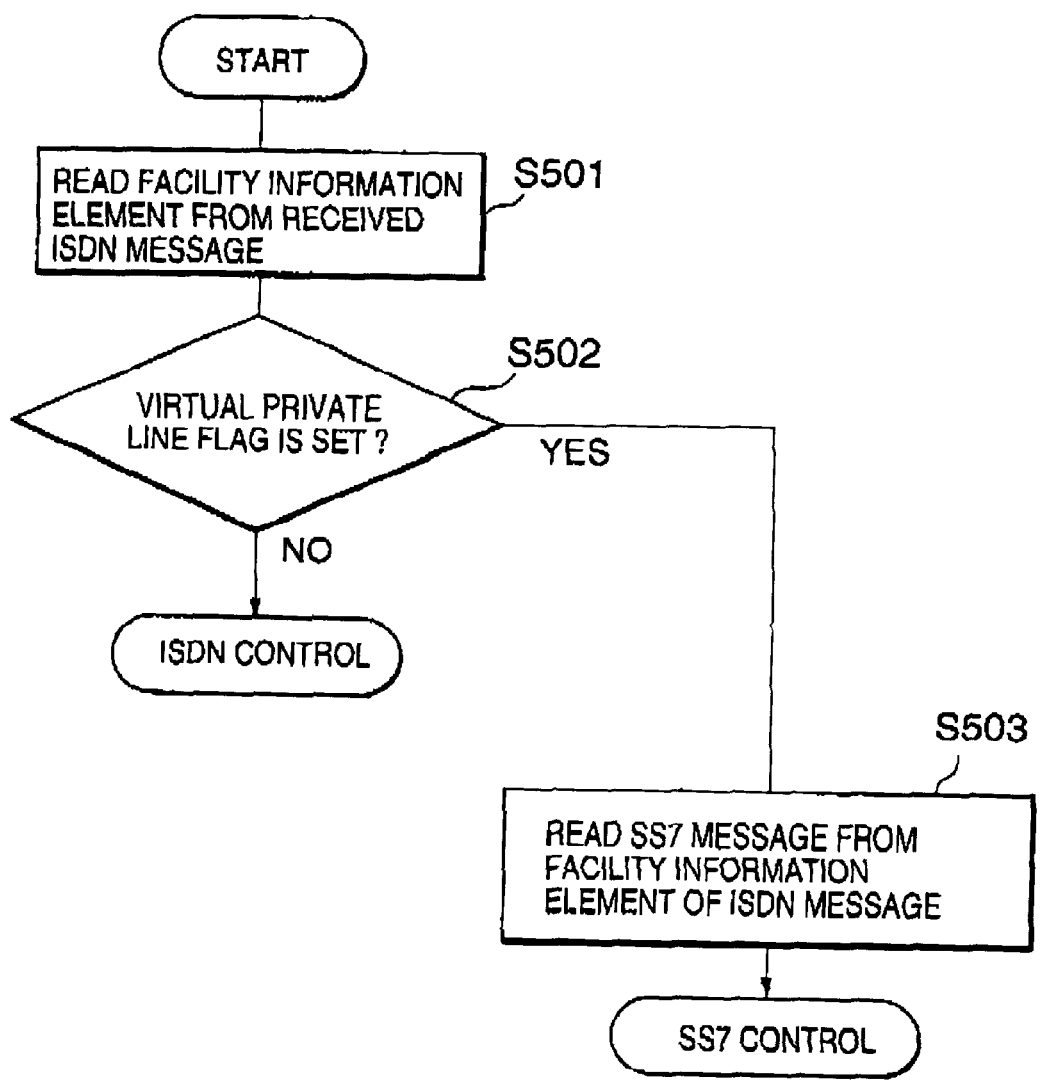
FIG. 5 is a flowchart showing an operation of a receiving PBX in the embodiment.

Referring to FIG. 5, when receiving the ISDN message having the SS7 message and the virtual private line flag encapsulated therein, the virtual private line controller 103 reads the Facility information element from the received ISDN message (step S501) Then, the virtual private line controller 103 determines whether the virtual private line flag of the Facility information element is set (step S502). When the virtual private line flag is set (YES in step S502), the virtual private line controller 103 reads the SS7 message from the Facility information element (step S503) and then outputs it to the SS7 controller 102.

In this way, by sending the ISDN message having the SS7 message encapsulated therein, the virtual private line 201 is established between the PBXs 100 and 130 to allow the terminals 110 and 140 to communicate with each other.

As described above, a virtual private line is established conforming to specifications for inter-PBX signalling protocol defined in the international standard ISO/IEC11582, ETS 300 239, JS-11582 Private Integrated Services Network (Generic Functional Protocol for the support of supplementary services).

In creation of an ISDN message corresponding to SS7 message, when the SS7 message is not associated with the communication channel 203, a SETUP message is used to implement communication conforming to the procedure of "connection-oriented APDU transfer independently of a call". When the SS7 message is associated with the communication channel 203, a FACILITY message is used to implement communication conforming to the procedure of "APDU transfer associated with a call".

A virtual private line may be established conforming to a protocol other that the inter-PBX signalling protocol defined in the international standard ISO/IEC11582, ETS 300 239, JS-11582 Private Integrated Services Network (Generic Functional Protocol for the support of supplementary services). Further, a virtual private line may be established by sending the ISDN message according to the packet communication protocol.

What is claimed is:

1. A method for establishing a virtual private line between a first private branch exchange (PBX) and a second PBX through an Integrated Services Digital Network (ISDN) to connect a first terminal accommodated in the first PBX and a second terminal accommodated in the second PBX, comprising the steps of:

at the first PBX having a first digital interface trunk circuit connected to the ISDN, a) generating an SS7 (common channel signalling system No. 7) message in response to a call originated by the first terminal;

b) generating an ISDN message having the SS7 message included therein; and c) sending the ISDN message to the second PBX on a D channel of the first digital interface trunk circuit, and at the second PBX having a second digital interface trunk circuit connected to the ISDN, d) receiving the ISDN message from the first PBX on a D channel of the second digital interface trunk circuit; and e) reading the SS7 message from the ISDN message received to establish the virtual private line between the first and second PBXs, allowing the first and second terminals to communicate with each other through the virtual private line, wherein the step (b) comprises the steps of:

b.1) generating an ISDN message for the SS7 message;

b.2) setting a virtual private line flag indicating that the SS7 message is used for virtual private line connection;

b.3) storing the virtual private line flag and the SS7 message in a facility information element of the ISDN message.

2. The method according to claim 1, wherein the step (e) comprises the steps of:

e.1) reading the facility information element from the ISDN message received from the first PBX;

e.2) determining whether the virtual private line flag included in the facility information element is set;

e.3) when the virtual private line flag is set, reading the SS7 message from the facility information element to establish the virtual private line.

3. The method according to claim 1, wherein in the step (b.1), a FACILITY message is generated for the SS7 message.

4. The method according to claim 1, wherein the virtual private line is established conforming to specifications for inter-PBX signalling protocol defined in the international standard ISO/IEC11582, ETS 300 239, JS-11582 Private Integrated Services Network (Generic Functional Protocol for the support of supplementary services).

5. The method according to claim 1, wherein the ISDN message is sent according to packet communication protocol.

6. A system for establishing a virtual private line between private branch exchanges (PBXs) through an Integrated Services Digital Network (ISDN), each of the PBXs comprising:

a digital interface trunk circuit connected to the ISDN, providing at least two B channels and one D channel;

an SS7 (common channel signalling system No. 7) controller;

a virtual private line controller controlling establishment of the virtual private line such that, when a first SS7 message is received from the SS7 controller in response to a call originated by a terminal accommodated in the PBX, a first ISDN message having the first SS7 message included therein is generated, and when a second ISDN message is received from the other PBX, a second SS7 message is read out from the second ISDN message to be output to the SS7 controller; and an ISDN controller for sending the first ISDN message to the other PBX on the D channel of the digital interface trunk circuit, and receiving the second ISDN message from the other PBX on the D channel, wherein the virtual private line controller generates an ISDN message for the first SS7 message, sets a virtual private line flag indicating that the first SS7 message is used for virtual private line connection, and stores the virtual private line flag and the first SS7 message in a facility information element of the ISDN message to produce the first ISDN message.

7. The system according to claim 6, wherein the virtual private line controller reads a facility information element from the second ISDN message received from the other PBX, determines whether the virtual private line flag included in the facility information element is set, and reading the second SS7 message from the facility information element when the virtual private line flag is set.

8. The system according to claim 6, wherein the ISDN message for the SS7 message is a FACILITY message.

9. The system according to claim 6, wherein the virtual private line is established conforming to specifications for inter-PBX signalling protocol defined in the international standard ISO/IEC11582, ETS 300 239, JS-11582 Private Integrated Services Network (Generic Functional Protocol for the support of supplementary services).

10. The system according to claim 6, wherein the ISDN message is sent according to packet communication protocol.

11. A method of generating a virtual private line, comprising the steps of:

storing a common channel signaling system no. 7 (SS7) message in a facility information element of an Integrated Services Digital Network (ISDN) message;

setting a virtual private line flag indicating that the common channel signaling system no. 7 (SS7) message is being used for virtual private line connection; and storing the virtual private line flag together with the SS7 message in the facility information element of the ISDN message.

12. The method according to claim 11, wherein the virtual private line is established conforming to specifications for inter-PBX signaling protocol defined in the international standards ISO/IEC11582, ETS 300 239, JS-11582 Private Integrated Services Network (Generic Functional Protocol for the support of supplementary services).

13. The method according to claim 11, wherein the ISDN message is sent according to packet communication protocol.

14. A method of generating a virtual private line, comprising the steps of:

storing a common channel signaling system no. 7 (SS7) message in a facility information element of an Integrated Services Digital Network (ISDN) message;

storing a virtual private line flag indicating that the common channel signaling system no. 7 (SS7) message is being used for virtual private line connection in the facility information element of the ISDN message.

15. The method of claim 14, comprising the further steps of:

using a setup message including both the common channel signaling system no. 7 (SS7) message and the virtual private line flag in the facility information elements of the setup message; and establishing a virtual private line according to packet communication protocol via recognition of the setup message.

* * * * *